United States Patent
Olsson et al.

(10) Patent No.: US 8,177,440 B2
(45) Date of Patent: May 15, 2012

(54) MOBILE ELECTRONIC DEVICE

(75) Inventors: Henrik Olsson, Malmo (SE); Johan Magnus Rikard Steijner, Loddekopinge (SE); Joannes De Jonge, Sodra Sandby (SE)

(73) Assignee: Sony Ericsson Mobile Communications AB, Lund (SE)

( * ) Notice: Subject to any disclaimer, the term of this patent is extended or adjusted under 35 U.S.C. 154(b) by 560 days.

(21) Appl. No.: 12/412,251

(22) Filed: Mar. 26, 2009

(65) Prior Publication Data

US 2010/0247091 A1    Sep. 30, 2010

(51) Int. Cl.
*G03B 17/38* (2006.01)

(52) U.S. Cl. .................................. 396/448; 396/503

(58) Field of Classification Search ............... 396/448, 396/503
See application file for complete search history.

(56) References Cited

U.S. PATENT DOCUMENTS

| | | | |
|---|---|---|---|
| 4,198,149 A * | 4/1980 | Nomura et al. | 396/503 |
| 2008/0046101 A1 | 2/2008 | Klein et al. | |

FOREIGN PATENT DOCUMENTS

| | | |
|---|---|---|
| DE | 102007029594 A1 | 1/2009 |
| EP | 0235733 A1 | 9/1987 |
| EP | 1271901 A1 | 1/2003 |
| EP | 1930200 A1 | 6/2008 |
| WO | 2006005418 A1 | 1/2006 |
| WO | 2009015733 A1 | 2/2009 |
| WO | 2009026405 A2 | 2/2009 |

OTHER PUBLICATIONS

European Patent Office, International Search Report for International Application No. PCT/EP2009/006916, Dec. 30, 2009.
European Patent Office, Written Opinion of the International Searching Authority for International Application No. PCT/EP2009/006916, Dec. 30, 2009.

* cited by examiner

*Primary Examiner* — W. B. Perkey
(74) *Attorney, Agent, or Firm* — McDonnell Boehnen Hulbert & Berghoff LLP

(57) ABSTRACT

A mobile electronic device is provided which includes a housing and a button arranged in an outer surface of the housing. Adjacent to the button, a surrounding member is provided. The surrounding member is movable with respect to the housing.

13 Claims, 7 Drawing Sheets

MOBILE ELECTRONIC DEVICE

FIELD OF THE INVENTION

The present invention relates to mobile electronic devices. More specifically, the present invention relates to mobile electronic devices including a button arranged in an outer surface of a housing of the mobile electronic device.

BACKGROUND

Present mobile electronic devices, such as mobile phones, digital cameras, media players, or the like, typically include a button or a key arranged in an outer surface of a housing of the mobile electronic device. By means of the button, a user of the mobile electronic device may control a function of the mobile electronic device, e.g. trigger operation of a camera function. Such a button is typically arranged in the outer surface of the housing so as to protrude with respect to a surrounding area of the button.

However, when arranging the button in the outer surface so as to protrude with respect to the surrounding area of the button, there is a risk that the button is operated accidentally, e.g. in a bag or a pocket, which may result in undesired activation of a function of the mobile electronic device, e.g. in undesired activation of a camera function. Further, a button which protrudes with respect to the outer surface of the housing may be undesirable in view of design aspects.

Accordingly, there is a need for mobile electronic devices which allow to address at least some of the above-mentioned problems.

SUMMARY

According to an embodiment of the invention, a mobile electronic device is provided. The mobile electronic device includes a housing, a button arranged in an outer surface of the housing, a surrounding member positioned adjacent to the button, and an actuating mechanism configured to move the surrounding member with respect to the outer surface of the housing.

According to an embodiment of the invention, the surrounding member is movable between a first position, in which the button protrudes with respect to the surrounding member by a first positive distance, and a second position, in which the button protrudes with respect to the surrounding member by a second distance which is smaller than the first distance. In the second position, the surrounding member may be substantially level with the button, i.e. the second distance may be substantially zero. Further, the second distance may be negative such that the button is recessed with respect to the surrounding member.

According to an embodiment, the first distance is equal to at least a stroke distance of the button, and the second distance is less than the stroke distance of the button.

According to an embodiment of the invention, the second position of the surrounding member is such that the surrounding member is substantially level with the outer surface of the housing.

According to an embodiment of the invention, the mobile electronic device further includes a switch which is mechanically coupled to the button, and a relative position of the switch with respect to the button is substantially the same in the first and second positions of the surrounding member.

According to an embodiment of the invention, the mobile electronic device further includes a first locking mechanism configured to lock the surrounding member in the second position. The first locking mechanism may include a self-locking function of the actuating mechanism or may be implemented by means of a self-locking function of the actuating mechanism.

According to an embodiment of the invention, the mobile electronic device further includes a second locking mechanism configured to lock the button when the surrounding member is in the second position.

According to an embodiment of the invention, the actuating mechanism is coupled to the surrounding member on opposite sides with respect to the button.

According to an embodiment of the invention, the mobile electronic device further includes a camera function or is implemented as a camera device. In this embodiment, the camera function or camera device may comprise a movable lens cover, and the actuating mechanism may be configured to be activated by movement of the lens cover. In this embodiment, the button may be a trigger button of the camera function or camera device.

According to an embodiment of the invention, the electronic device further includes an electromechanic actuator, and the actuating mechanism is configured to be activated by operation of the electromechanic actuator.

According to an embodiment of the invention, a mobile electronic device is provided which includes a housing, a camera function having a trigger button arranged in an outer surface of the housing, and a surrounding member positioned adjacent to the trigger button. The surrounding member is movable with respect to the outer surface of the housing.

Those skilled in the art will appreciate that features of the above-mentioned embodiments may be combined with each other as appropriate and new embodiments may be formed by combining one or more features of the above-mentioned embodiments.

The foregoing and other features and advantages of the invention will become further apparent from the following detailed description and the accompanying drawings.

BRIEF DESCRIPTION OF THE DRAWINGS

Embodiments of the present invention are illustrated by the accompanying figures, in which.

DETAILED DESCRIPTION

Figure 1:
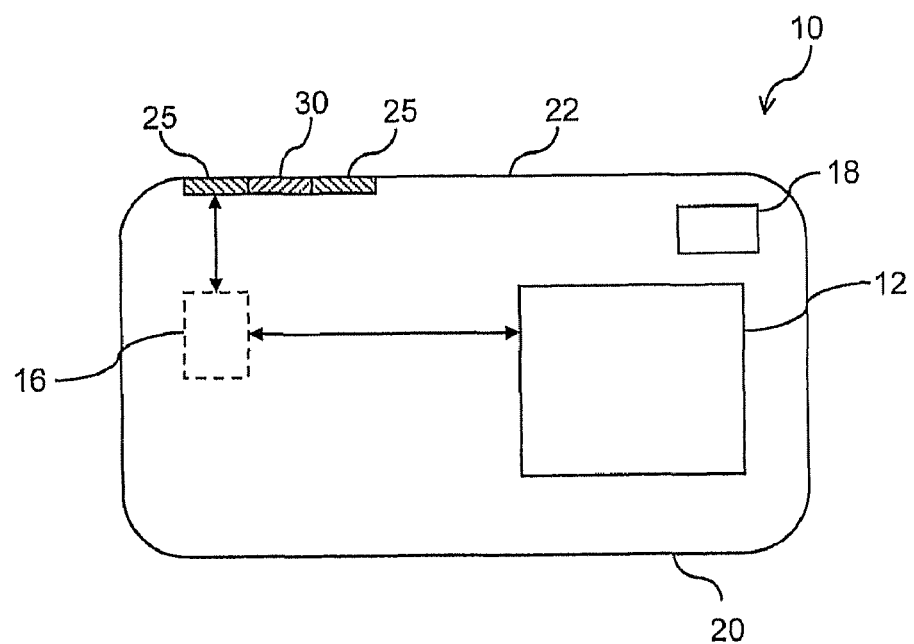
FIG. 1 schematically illustrates a mobile electronic device according to an embodiment of the invention in a non-operative state of a camera function.

In the following, embodiments of the present invention will be described in more detail and with reference to the accompanying drawings. The described embodiments are intended to be merely exemplary and are not to be construed as limiting the scope of the present invention. It should be noted that in the drawings the elements are not necessarily in scale with each other but have been depicted in a manner which allows for conveying the features of the illustrated embodiments to a person skilled in the art.

In the following detailed description, embodiments of the present invention are described which relate to a mobile electronic device in the form of a digital camera or a mobile phone equipped with a digital camera function. However, it is to be understood that the concepts described hereinafter could also be applied to other types of mobile electronic devices, such as media players, portable computers, hand-held video game consoles, personal digital assistants (PDAs), or the like. It is to be understood that the details of the electronic circuitry provided in the mobile electronic device will depend on the type of application the mobile electronic device is intended for.

Figure 2:
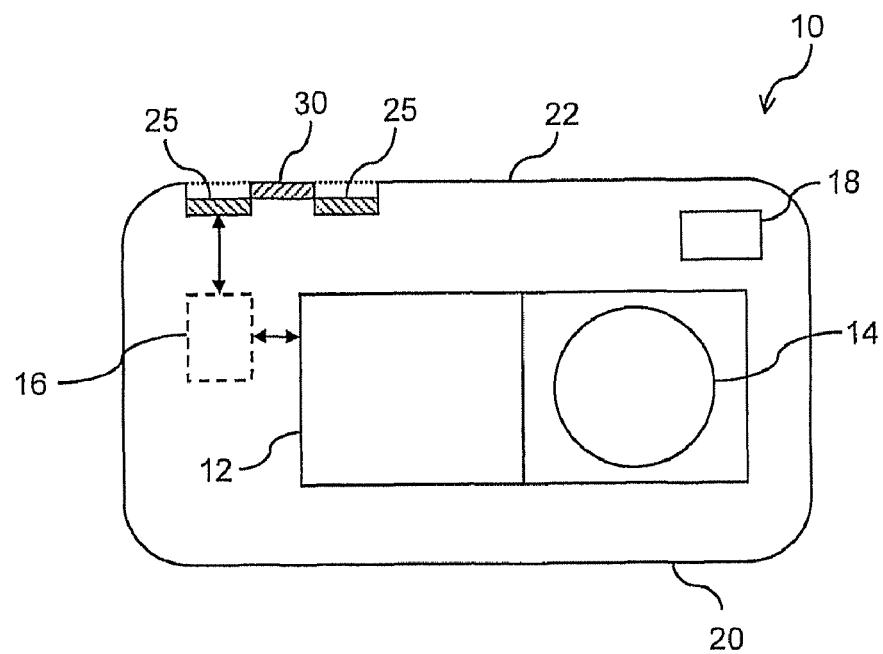
FIG. 2 schematically illustrates the mobile electronic device of FIG. 1 in an operative state of the camera function.

In FIGS. 1 and 2, a mobile electronic device 10 equipped with a digital camera function is illustrated. The mobile electronic device may be a digital camera or a multi-purpose electronic device, e.g. a mobile phone equipped with a digital camera function.

In FIG. 1, the mobile electronic device 10 is illustrated in a non-operative state of the digital camera function, in which the digital camera function is deactivated. In FIG. 2, the mobile electronic device 10 is illustrated in an operative state of the digital camera function, in which the digital camera function is activated.

As illustrated in FIGS. 1 and 2, the mobile electronic device 10 includes a housing 20 which may have a bar shape or a cuboid shape. Outer surfaces of the housing may be planar surfaces or curved surfaces. On one outer surface of the housing 20, components of the camera function are arranged. These components include a camera lens 14 which may be selectively covered by a movable lens cover 12. Other components of the camera function may include a flashlight 18, processing circuitry, a data storage device, or the like. The lens cover 12 may be slideable between two positions so as to selectively cover the camera lens 14. In other embodiments, other types of movable lens covers may be used.

On a further outer surface 22 of the housing 20, a button 30 is provided which may be used to control operations of the camera function. The button 30 may be a trigger button of the camera function. That is to say, pushing the button may cause the camera function to record a digital image. However, it is to be understood that other functions may be controlled by means of the button 30 as well. For example, the button 30 could be used to control a zoom function of the camera function. The button 30 is configured to be operated by pushing onto the button. Accordingly, the button 30 may also be referred to as a push button.

Adjacent to the button 30, a surrounding member 25 is provided. The surrounding member 25 may completely surround the button 30. Alternatively, the surrounding member 25 may only partially surround the button 30.

In FIG. 1, the mobile electronic device 10 is in the non-operative state of the camera function. In this state, the lens cover 12 covers the lens 14, thereby providing protection with respect to damages and contamination. In addition, the surrounding member 25 is in a position in which there is no significant protrusion of the button 30 with respect to the surrounding member 25. Specifically, the surrounding member 25 is positioned so as to have its outer surface substantially level with the outer surface 22 of the housing and the outer surface of the button 30.

In the operative state of the camera function, as illustrated in FIG. 2, the camera lens 14 is exposed, e.g. due to a sliding movement of the lens cover 12. In this state, the surrounding member 25 is lowered with respect to its position in the non-operative state of the camera function. In this way, the button 30 protrudes with respect to the surrounding member 25 by a given positive distance. In this position of the surrounding member 25, the button 30 may be actuated by a user in a comfortable manner. The position of the button 30 in the operative state of the camera function is substantially the same as in the non-operative state. In this respect, it is to be understood that the explanations concerning the position of the button relate to a non-operated configuration of the button 30 and that the button 30 may be displaced from this idle position when actuated by a user.

Accordingly, the surrounding member 25 may be moved between a first position, in which the button 30 protrudes with respect to the surrounding member 25, and a second position, in which the button 30 does not significantly protrude with respect to the surrounding member 25. In the first position, the button 30 may protrude with respect to the surrounding member 25 by a first positive distance, which may be equal to at least a stroke distance of the button 30, thereby facilitating operation of the button. In the second position, the button 30 protrudes with respect to the surrounding member 25 by a smaller second distance, which may be smaller than the stroke distance of the button 30. In some embodiments, the second distance may be substantially zero such that the button 30 is substantially level with the surrounding member 25. In some embodiments, the second position of the surrounding member 25 may be such that the button 30 is recessed with respect to the surrounding member 25, i.e. the second distance may be negative. The second position of the surrounding member 25 is useful to prevent accidental operation of the button 30. Further, the button 30 is protected, and the housing 20 of the mobile electronic device 10 may be designed with a substantially even outer contour.

In the illustrated embodiment, only the surrounding member 25 is moved relative to the outer surface 22 of the housing 20 so as to set different protruding distances of the button 30 with respect to the surrounding member 25. However, it is to be understood that in other embodiments both the button 30 and the surrounding member 25 may be moved with respect to the outer surface 22 of the housing 20.

As further illustrated in FIGS. 1 and 2, the mobile electronic device 10 may include an electromechanic actuator 16. The electromechanic actuator 16 may be used to move the lens cover 12. Further, the electromechanic actuator 16 may be used to move the surrounding member 25 between the above-mentioned first and second positions. For this purpose, both the surrounding member 25 and the lens cover 12 may be directly coupled to the electromechanic actuator 16 (as illustrated by double-headed arrows). Alternatively, the electromechanic actuator 16 may be coupled directly to the lens cover 12, and the surrounding member 25 may be coupled indirectly to the electromechanic actuator 16 via the lens cover 12. Further, the surrounding member 25 could be coupled directly to the electromechanic actuator 16 and the lens cover 12 could be coupled indirectly to the electromechanic actuator 16 via the surrounding member 25. As a further alternative, separate electromechanic actuators could be provided for the lens cover 12 and/or the surrounding member 25. In addition, the lens cover 12 could be configured to be manually opened by direct or indirect mechanical action of a user, and the surrounding member 25 could be coupled to the lens cover 12 so as to be moved between its two positions. That is to say, different types of electromechanic or purely mechanic actuators could be used for moving the surrounding member 25 between its two positions.

In FIGS. 3-6, a button arrangement according to an embodiment of the invention is illustrated. The button arrangement may be used in the mobile electronic device 10 as illustrated in FIGS. 1 and 2. In FIGS. 3-6, components which correspond to those of FIGS. 1 and 2 have been designated by the same reference signs.

Figure 3:
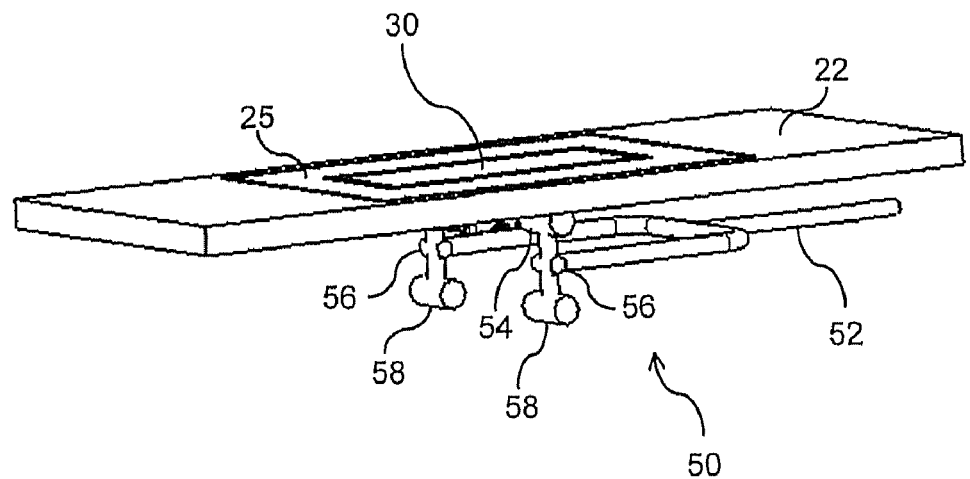
FIG. 3 shows a schematic perspective view of a button arrangement according to an embodiment of the invention in a non-operative state.
Figure 4:
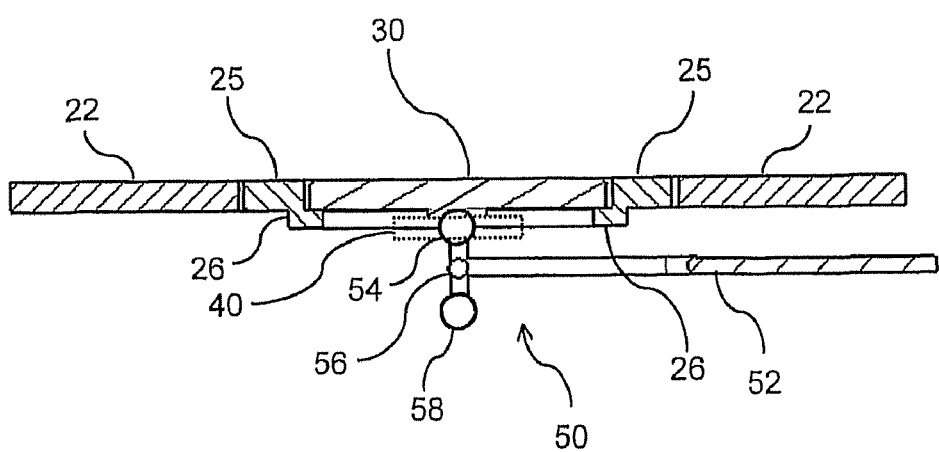
FIG. 4 shows a schematic sectional view of the button arrangement of FIG. 3.
Figure 5:
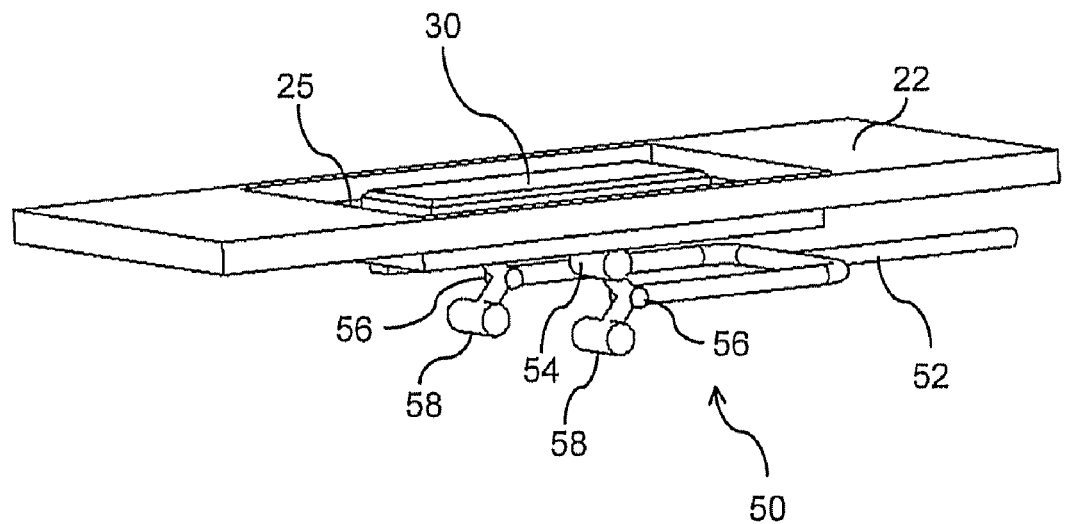
FIG. 5 shows a schematic perspective view of the button arrangement of FIGS. 3 and 4 in an operative state.
Figure 6:
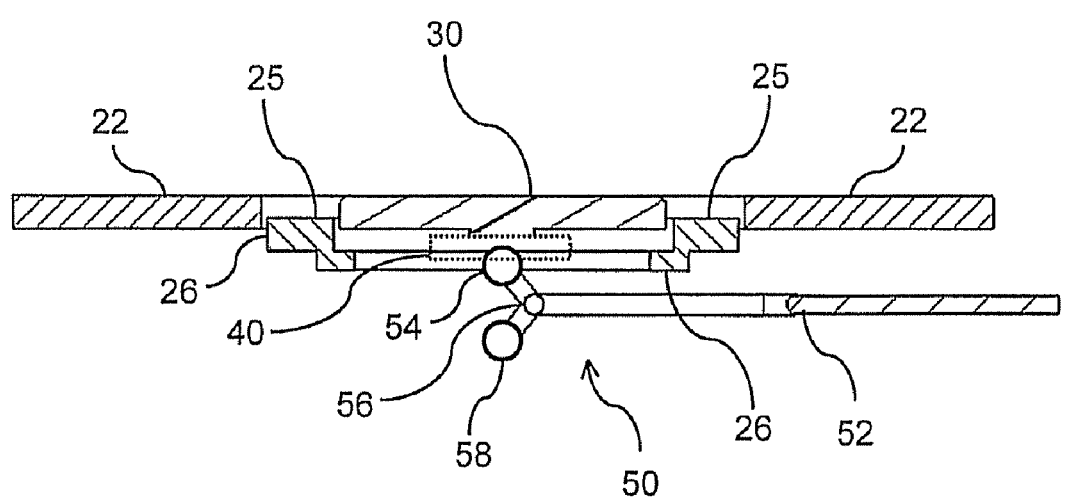
FIG. 6 shows a schematic sectional view of the button arrangement of FIG. 5.

In FIGS. 3 and 4, the button arrangement is in a non-operative state, and the surrounding member 25 is in its second position and substantially level with the button 30 and the outer surface 22 of the housing. In FIGS. 5 and 6, the button arrangement is in an operative state, and the surrounding member 25 is in its first position in which the button 30 protrudes with respect to the surrounding member 25.

As illustrated in FIGS. 3-6, the button 30 is mechanically coupled to a switch 40. The switch 40 may be used to control electric signals. For example, the switch 40 may be brought from an open state to a closed state by moving the button 30 toward the switch 40. For a better overview, the switch 40 is illustrated as being transparent.

Further, FIGS. 3-6 illustrate an actuating mechanism 50 which is configured to move the surrounding member 25 between the first and second positions. Structures and operations of the actuating mechanism 50 will be further explained in the following.

The actuating mechanism 50 is coupled to the surrounding member 25 via a first articulation 54. A first lever arm couples the first articulation 54 to a second articulation 56. A second lever arm couples the second articulation 56 to a third articulation 58. A control rod 52 is coupled to the second articulation 56. The third articulation 58 is connected to a support point which is fixed with respect to the outer surface 22 of the housing. Accordingly, the control rod 52 may be used to move the second articulation 56 with respect to the first articulation 54 and the third articulation 58.

In the second position of the surrounding member 25, as illustrated in FIGS. 3 and 4, the first articulation 54, the second articulation 56, and the third articulation 58 are arranged on a single line which extends perpendicular to the outer surface 22 of the housing. In the first position of the surrounding member 25, as illustrated in FIGS. 5 and 6, the second articulation 56 is displaced from a line connecting the first articulation 54 and the third articulation 58, thereby shortening the distance between the first articulation 54 and the third articulation 58. In this way, the surrounding member 25 is moved toward the third articulation 58 and thus moved with respect to the outer surface 22 and the button 30. Irrespective of the movement of the surrounding member 25, the button 30 and the switch 40 remain in the same position. Accordingly, a tolerance chain of the button-switch arrangement is not affected by the movement of the surrounding member 25.

As can be further taken from the illustrations of FIGS. 3-6, a first locking mechanism is provided which prevents movement of the surrounding member 25 from its second position unless the actuating mechanism 50 is activated. In the illustrated example, the first locking mechanism is implemented by a self-locking capability of the actuating mechanism 50. As mentioned above, in the second position of the surrounding member 25, the first articulation 54, the second articulation 56, and the third articulation 58 are arranged on a single line. Accordingly, an external force acting onto the surrounding member 25 will not be able to displace the surrounding member 25 toward the third articulation 58 (i.e. toward the first position) unless the second articulation 56 is displaced by activating the actuating mechanism 50. Other types of locking mechanisms may be used in addition or as an alternative to prevent undesired movement of the surrounding member 25 from its second position. For example, selectively movable locking members could be brought into the travel path of the surrounding member 25.

As further illustrated, the button arrangement may further include a second locking mechanism which is configured to lock the button 30 when the surrounding member 25 is in its second position. In the illustrated example, this second locking mechanism is provided by abutting portions 26 formed on the surrounding member 25. The abutting portions are arranged in a manner such that the button 30 abuts on these abutting portions 26 when the surrounding member 25 is in its second position, thereby preventing movement of the button 30 toward the switch 40. In the first position of the surrounding member 25, the abutting portions 26 are spaced apart from the button 30, thereby allowing movement of the button with respect to the switch 40. Accordingly, accidental operation of the button 30 can be further avoided.

As further illustrated in FIGS. 3-6, the actuating mechanism 50 is coupled to the surrounding member 25 on two sides, which are arranged oppositely with respect to the button 30. Specifically, the first articulation 54, the second articulation 56, and the third articulation 58, as well as the connecting lever arms therebetween, are provided on both sides of the surrounding member 25. For simultaneously acting on the two second articulations 56, the control rod 52 is branched into two portions. By coupling the actuating mechanism to the surrounding member 25 on two opposite sides, movement of the surrounding member 25 can be controlled in a symmetric manner. However, it is to be understood that in other embodiments only one coupling point of the actuating mechanism 50 with respect to the surrounding member 25 could be provided, or additional coupling points of the actuating mechanism 50 with respect to the surrounding member 25 (e.g. three or more coupling points) could be provided.

Further, as illustrated in FIGS. 3-6, the control rod 52 is moved in a direction which is substantially perpendicular to the line connecting the first articulation 54 and the third articulation 58. However, in other embodiments the direction of movement of the control rod 52 may be different and extend in an oblique direction with respect to the line connecting the first articulation 54 and the third articulation 58.

As already indicated in connection with FIGS. 1 and 2, the control rod 52 of the actuating mechanism 50 may be directly or indirectly coupled to an electromechanic actuator (e.g. the electromechanic actuator 16) or may be directly or indirectly coupled to a manual actuator, e.g. via the lens cover 12.

In FIGS. 7-10, a button arrangement according to a further embodiment of the invention is illustrated. The button arrangement of FIGS. 7-10 is similar to that of FIGS. 3-6, and similar or corresponding components have been designated by the same reference signs. In the following, only the differences of the button arrangement of FIGS. 7-10 as compared to that of FIGS. 3-6 will be explained.

In the button arrangement of FIGS. 3-6, the button 30 is provided with a substantially planar outer surface. As compared to that, the button arrangement of FIGS. 7-10 is provided with a button 30' having a curved outer surface.

Figure 7:
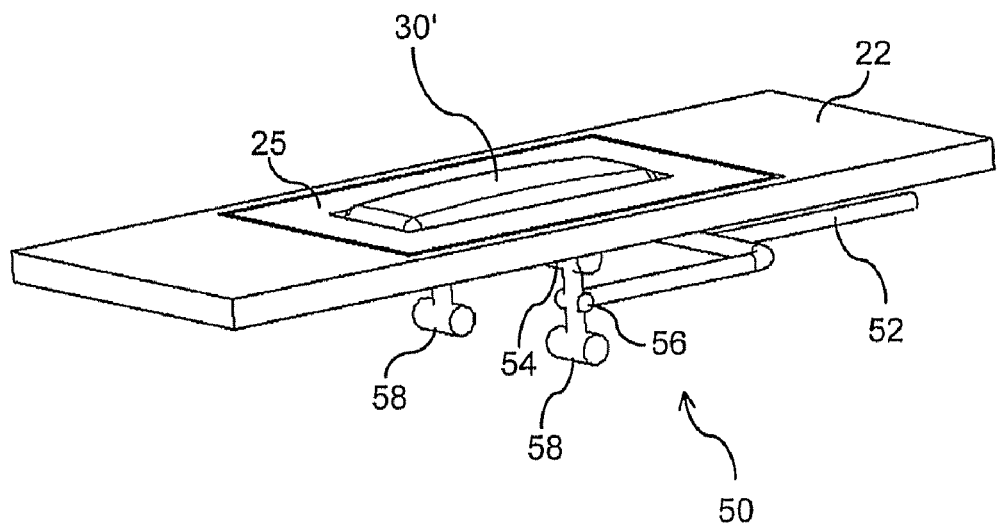
FIG. 7 shows a schematic perspective view of a button arrangement according to a further embodiment of the invention in a non-operative state.
Figure 8:
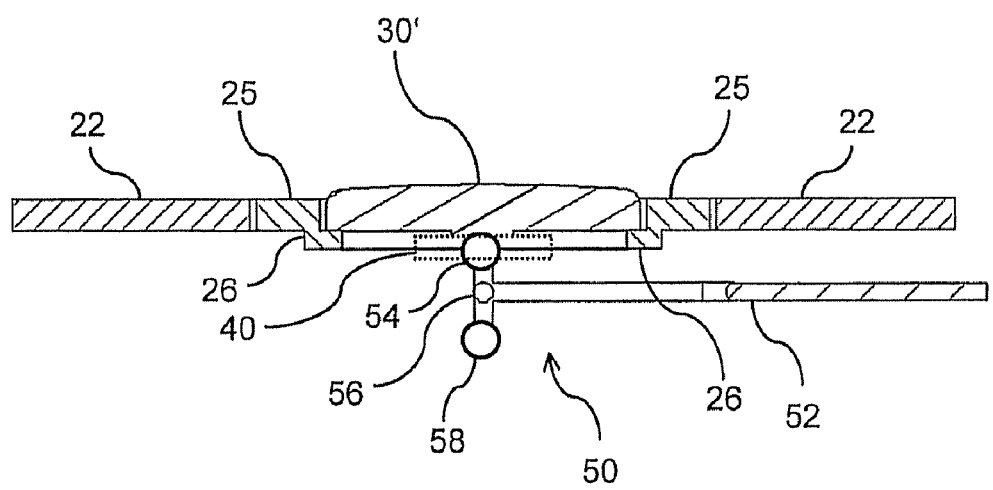
FIG. 8 shows a schematic sectional view of the button arrangement of FIG. 7.
Figure 9:
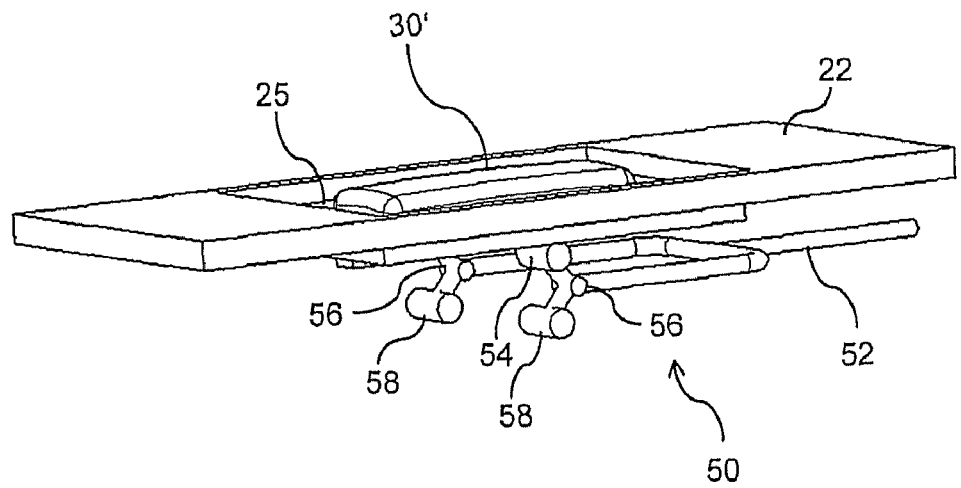
FIG. 9 shows a schematic perspective view of the button arrangement of FIGS. 7 and 8 in an operative state.
Figure 10:
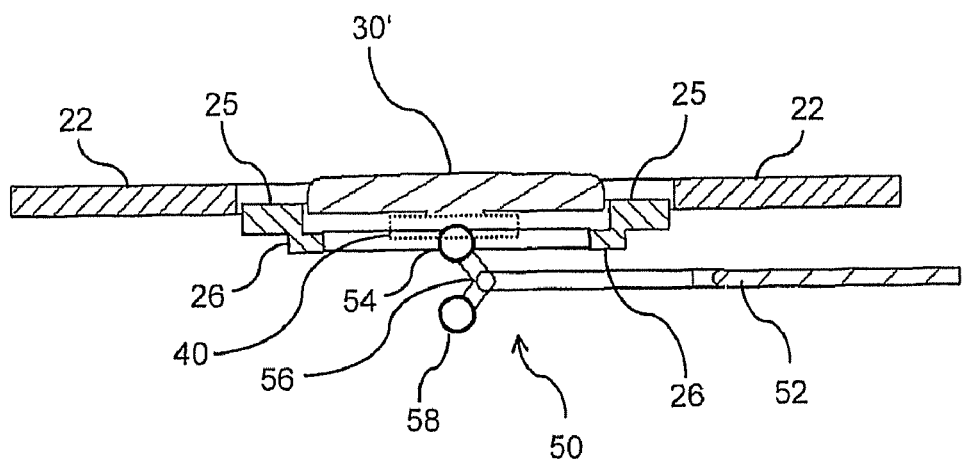
FIG. 10 shows a schematic sectional view of the button arrangement of FIG. 9.

In FIGS. 7 and 8, the button arrangement is in a non-operative state with the surrounding member 25 in its second position. In FIGS. 9 and 10, the button arrangement is in an operative state with the surrounding member 25 in its first position. Again, in the first position of the surrounding member 25, the button 30' protrudes with respect to the surrounding member 25 by a positive first distance, which may be at least a stroke distance of the button 30'. In the second position of the surrounding member 25, the button 30' only slightly protrudes with respect to the surrounding member 25 by a second distance, which is less than the stroke distance of the button 30'. Accordingly, although there is a slight protrusion of the button 30' with respect to the surrounding member 25 in the second position, accidental operation of the button 30' is avoided.

Figure 11:
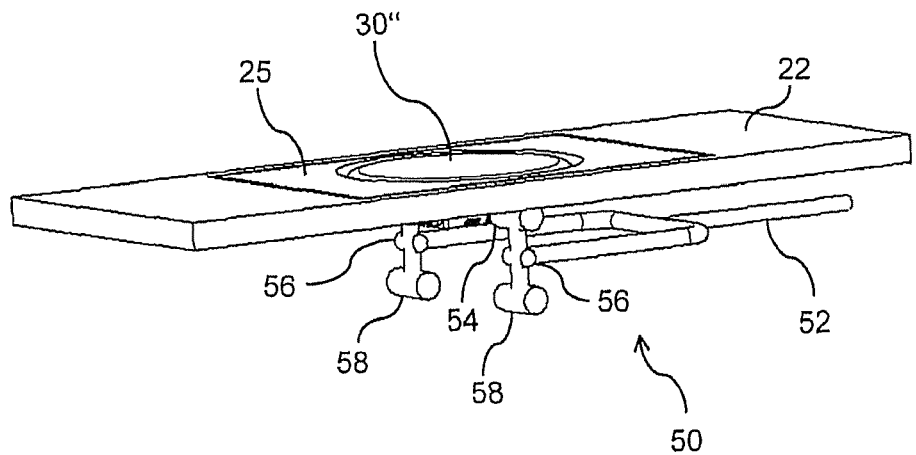
FIG. 11 shows a schematic perspective view of a button arrangement according to a further embodiment of the invention in a non-operative state.
Figure 12:
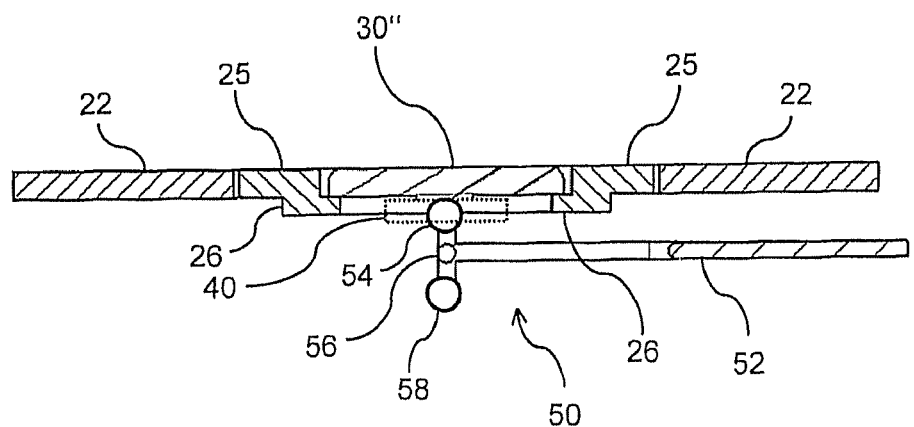
FIG. 12 shows a schematic sectional view of the button arrangement of FIG. 11.
Figure 13:
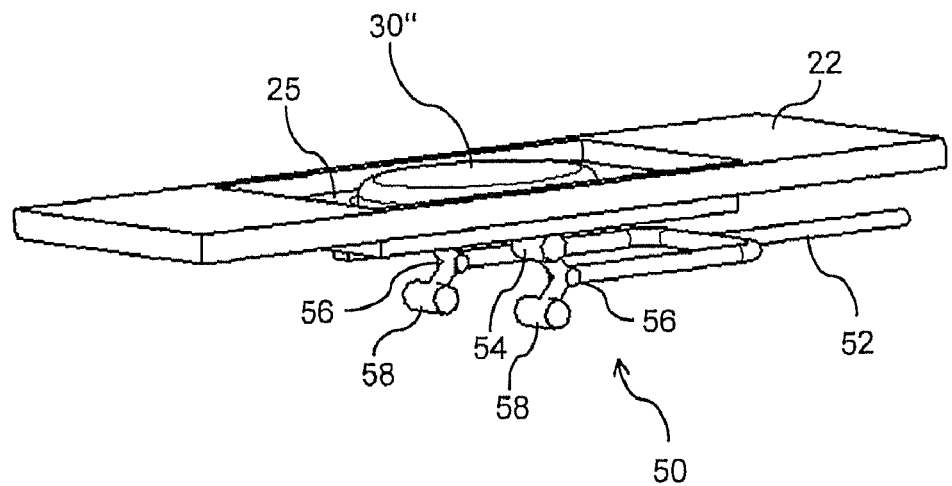
FIG. 13 shows a schematic perspective view of the button arrangement of FIGS. 11 and 12 in an operative state.
Figure 14:
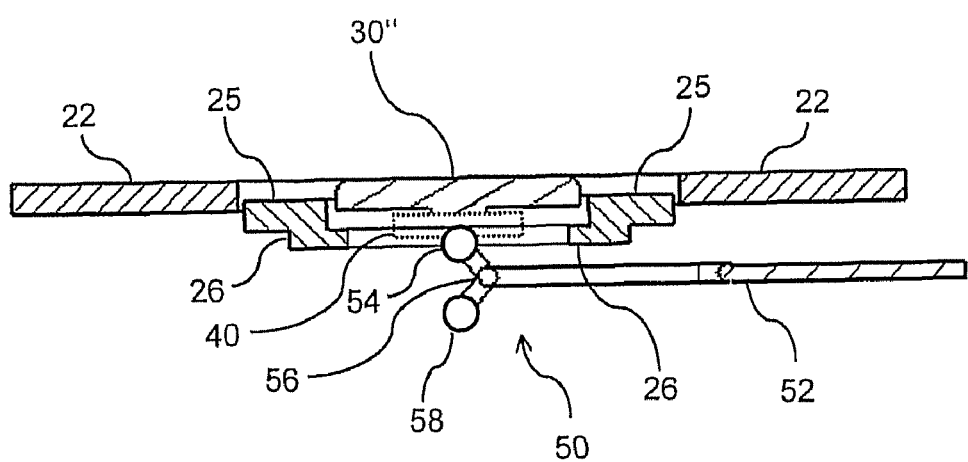
FIG. 14 shows a schematic sectional view of the button arrangement of FIG. 13.

In FIGS. 11-14, a button arrangement according to a still further embodiment of the invention is illustrated. The button arrangement of FIGS. 11-14 is similar to those as illustrated in FIGS. 3-10, and similar or corresponding components have been designated by the same reference signs. In FIGS. 11 and 12, the button arrangement is in a non-operative state with the surrounding member 25 in its second position. In FIGS. 13 and 14, the button arrangement is in an operative state with the surrounding member 25 in its first position. In the following, only the differences as compared to the button arrangements of FIGS. 3-10 will be explained.

As compared to the button arrangements of FIGS. 3-10, in which the button 30 or the button 30' have a substantially rectangular outer contour, the button arrangement of FIGS. 11-14 is provided with a button 30" having a substantially circular outer contour. Like in the button arrangement of FIGS. 3-6, the button 30" is provided with a planar outer surface. In the second position of the surrounding member 25, the button 30" is substantially level with the surrounding member 25 and the outer surface 22 of the housing. In other embodiments, the button 30" could be provided with a curved outer surface, e.g. as illustrated in FIGS. 7-10.

It is to be understood that the embodiments and examples as described above have been provided for the purpose of illustrating the general concepts of the present invention and various modifications are possible therein without departing from the scope of the present invention. For example, features of the above embodiments and examples could be combined with each other as appropriate. Further, the described concepts could be applied in other types of mobile electronic devices. That is to say, according to the type of mobile electronic device, different functions of the button could be provided. For example, the button could be a button for activating a voice-recorder function or for activating a media-playback function. Further, different types of button are possible. For example, the push button of the above embodiments and examples could be replaced by a slide button or other types of button. Also, it is to be understood that the surrounding member may only partially surround the button, or that multiple buttons may be surrounded by the surrounding member.

What is claimed is:

1. A mobile electronic device, comprising:
a housing,
a push button arranged in an outer surface of the housing,
a surrounding member positioned adjacent to the push button, and
an actuating mechanism configured to move the surrounding member with respect to the outer surface of the housing,
wherein the surrounding member is movable between a first position, in which the push button protrudes with respect to the surrounding member by a first positive distance, and a second position, in which the push button protrudes with respect to the surrounding member by a second distance which is smaller than the first distance,
wherein the first distance is equal to at least a stroke distance of the push button; and
wherein the second distance is less than the stroke distance of the push button.

2. The mobile electronic device according to claim 1, wherein in said second position the surrounding member is substantially level with the push button.

3. The mobile electronic device according to claim 1, wherein in said second position the surrounding member is substantially level with the outer surface of the housing.

4. The mobile electronic device according to claim 1, comprising:
a switch mechanically coupled to the push button,
wherein a relative position of the switch with respect to the push button is substantially the same in the first and second positions of the surrounding member.

5. The mobile electronic device according to claim 1, comprising:
a first locking mechanism configured to lock the surrounding member in said second position.

6. The mobile electronic device according to claim 5, wherein the first locking mechanism comprises a self-locking function of the actuating mechanism.

7. The mobile electronic device according to claim 1, comprising:
a locking mechanism configured to lock the push button when the surrounding member is in said second position.

8. The mobile electronic device according to claim 1, wherein the actuating mechanism is coupled to the surrounding member on opposite sides with respect to the push button.

9. The mobile electronic device according to claim 1, comprising:
a camera device.

10. The mobile electronic device according to claim 8, wherein the camera device comprises a movable lens cover, and
wherein the actuating mechanism is configured to be activated by movement of the lens cover.

11. The mobile electronic device according to claim 9, wherein the push button is a trigger button of the camera device.

12. The mobile electronic device according to claim 1, comprising:
an electromechanic actuator,
wherein the actuating mechanism is configured to be activated by operation of the electromechanic actuator.

13. A mobile electronic device, comprising:
a housing,
a camera device having a trigger button arranged in an outer surface of the housing and configured to be operated by pushing onto the trigger button, and
a surrounding member positioned adjacent to the trigger button,
wherein the surrounding member is movable with respect to the outer surface of the housing between a first position, in which the trigger button protrudes with respect to the surrounding member by a first positive distance, and a second position, in which the trigger button protrudes with respect to the surrounding member by a second distance which is smaller than the first distance,
wherein the first distance is equal to at least a stroke distance of the trigger button; and
wherein the second distance is less than the stroke distance of the trigger button.

* * * * *